Figure 1:
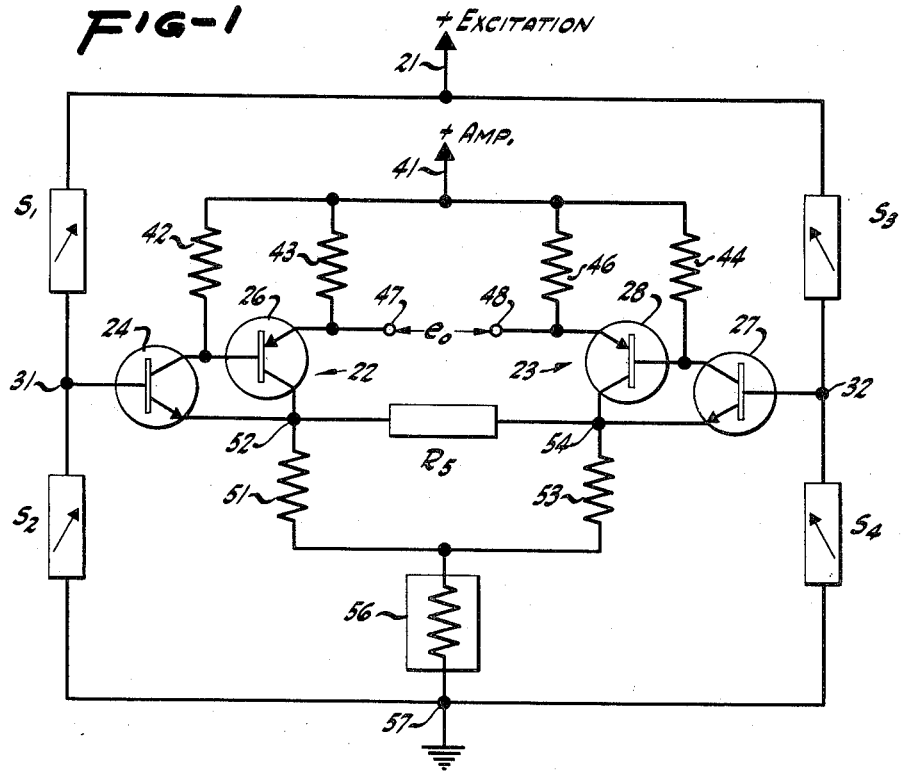

Dec. 15, 1964

J. E. AMES, JR 3,161,045

STRAIN GAUGE COMPENSATION

Filed Aug. 18, 1961

INVENTOR.
JOHN E. AMES, JR.

BY

*Lippincott, Ralls & Hendrickson*
ATTORNEYS

3,161,045
STRAIN GAUGE COMPENSATION

John E. Ames, Jr., Altadena, Calif., assignor to Fairchild Camera and Instrument Corporation, Syosset, Long Island, N.Y., a corporation of Delaware
Filed Aug. 18, 1961, Ser. No. 132,502
3 Claims. (Cl. 73—88.5)

The present invention relates to an improvement in strain gauge circuitry, and more particularly to integral amplifier gain compensation to the end of compensating for the sensitivity dependence with temperature of strain gauge elements.

The utilization of strain gauges for a wide variety of applications requires a high degree of accuracy to insure usable results. With regard to semiconductor sensing units, which may be advantageously employed in strain gauge transducer units, it is well recognized that temperature variations introduce undesirable errors. Unless steps are taken to compensate for these variations in semiconductor properties with temperature, the utility of this type of device is materially limited. With this general recognition of the problem, there have been advanced a wide variety of methods and means for compensation.

Of particular importance in connection with the utilization of semiconductor sensor elements in strain gauge transducers is the apparently unavoidable variation in sensitivity changes of the semiconducting material with variations in temperature. The present invention is particularly directed to the automatic compensation for such sensitivity changes, and does attain this result by the utilization of particular electrical circuitry and physical configuration. In accordance with the present invention, there is provided a transducer unit including not only the semiconductor sensor elements of a strain gauge, but also, a transistorized amplifier associated with such elements. This integral amplifier forming a part of the transducer unit itself operates from the gauge elements to produce an amplified indication of applied stresses, while at the same time automatically compensating for variations in sensitivity of these sensor elements.

The improved strain gauge circuitry of the present invention is furthermore advantageous in affording a material simplification in overall strain gauge circuitry. This simplification is achieved while at the same time providing good gain stability. While it is possible to employ semiconductor sensing elements in various configurations for strain gauge utilization, it is particularly advantageous to utilize a bridge circuit in this respect. This type of arrangement for strain gauges is well known in the art, and the following disclosure is referenced to a strain bridge including at least one semiconducting sensor unit, and producing a differential output as an indication of applied stresses to such element. The invention hereof affords a simplification in amplifier biasing through the utilization of the strain bridge itself, a cancellation of residual zero offset, a gain balance, and an optimization of the operating point of the amplifier transistors for best linearity independently from the gain.

The present invention is herein illustrated and described in connection with a single, preferred embodiment thereof, and no limitation is intended by the terms of this description, but instead, reference is made to the appended claims for a precise delineation of the true scope of this invention.

Figure 2:
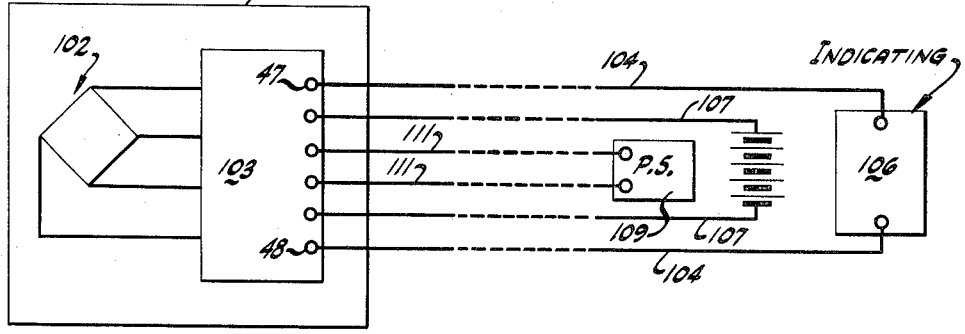

The invention is illustrated in the accompanying drawings, wherein:

FIGURE 1 is a circuit diagram of the invention; and
FIGURE 2 is a schematic illustration of the physical separation of portions of the present invention.

The present invention, in brief, provides for the inclusion of sensor elements and transistorized amplifier circuitry in a transducer unit adapted for disposition in a position to experience stresses to be measured. This transducer unit may be employed for a wide variety of applications such as, for example, in the measurement of acceleration, pressure, applied forces, etc. Associated with the transducer unit itself are remotely located measuring means and excitation means. It is to be appreciated that the transducer unit of a strain gauge is oftentimes required to be physically disposed in relatively inaccessible positions, wherein available space is limited and wherein ambient conditions, such as temperature, may vary considerably. While it is not possible under all circumstances to control the ambient conditions, there is provided by the present invention for the compensation of any errors which may be introduced by variations in these conditions. In particular, the difficulties arising from temperature variations are fully and automatically compensated for by the circuitry of the present invention. With a plurality of semiconducting sensor elements in a bridge array, such as a Wheatstone bridge circuit, there is provided for excitation of this bridge across one diagonal thereof, and the amplification of voltage variations occuring across the other bridge diagonal as a result of stresses applied to one or more elements of the bridge. This amplification, in accordance herewith, is carried out with a very high current gain, so that the resultant voltage gain is essentially a function of particular resistors included in the amplifier circuit, and consequently, temperature effects upon the transistors of the amplifier have only a negligible effect on gain stability. There is furthermore provided hereby that the amplification shall be carried out by a balanced amplifier with provision for cancellation of zero signal differences resulting from bridge and transistor unbalance. Control is also provided over the gain of the separate portions of the amplifier hereof, so that zero shifts with temperature and/or changes in bias level of the transistorized amplifier are minimized.

Considering now the present invention in somewhat greater detail, and referring first to FIGURE 1 of the drawing, there will be seen to be illustrated some four semiconducting sensor elements S1, S2, S3, and S4, electrically connected together in a bridge circuit. As regards the physical disposition of elements of the present invention, further discussion thereof is set forth below in connection with FIGURE 2, and the showing of FIGURE 1 is schematic to emphasize circuit connections and relationships. The bridge circuit is energized as indicated by the lead 21 marked "+ excitation," the diagonally opposite side of the bridge being adapted for connection to the negative excitation such as, for example, electrical ground, as illustrated. With excitation voltage applied across the sensor elements of the strain bridge, there will be produced voltages at the opposite diagonals of the bridge, and with regard to the production of output signals from the bridge, there are herein employed a pair of amplifiers herein denoted as complementary composite transistor connections 22 and 23. Each of these composite connections is identical, and it will be seen that the connection 22, for example, includes a first transistor 24 having the collector thereof joined to the base of a second transistor 26, and the emitter thereof connected to the collector of this second transistor. The two ransistors 24 and 26 will be seen from the illustration to be of opposite types, and with this connection of the two transistors wherein an input signal is applied to the base of the first transistor 24, there is achieved the equivalent of a single transistor with the polarity of the input section and having a current gain approximately equal to the product of the individual current gains of the two transistors. It is advantageous in this circuitry to employ an N-P-N transistor for the input stage 24, and a P-N-P type in the second stage 26, because of the lower leakage current obtainable in the N-P-N type transistor. As a result of the substantial equivalence of this circuit connection to that of a single device, and the augmentation of current gain as noted above, it is appropriate to term the two-transistor connection as a complementary composite connection. The other complementary composite transistor connection 23 includes a first stage transistor 27 and a second stage transistor 28 connected in the same manner as described above. The base of the first stage transistor 24 of the connection 22 is connected to a bridge terminal 31, while the base of the input stage 27 of the second composite connection 23 is connected to a second bridge terminal 32. The bridge terminals 31 and 32 are disposed at opposite sides of the output diagonal of the strain bridge, as related to the diagonal of the bridge across which excitation voltage is applied.

Each of the complementary composite connections 22 and 23 serves as an amplifier, and it will be seen that inasmuch as the amplifier inputs are directly connected to the bridge, there is thus provided a stable bias supply from the bridge itself. Consequently, there is applied to these amplifiers from the bridge the signals from the bridge and also the bias supply for operation of the amplifiers. As above noted, a very substantial current gain is obtained from each of the composite pairs 22 and 23, and consequently, the voltage gain of these amplifiers is essentially determined by the circuit resistances associated therewith.

Further with regard to the electrical circuitry of the amplifier hereof, there is provided a power supply terminal 41 adapted to have a positive voltage impressed thereon. A resistor 42 is connected between the collector-base lead of the pair 22 to this power supply terminal, and a resistor 43 is connected from the output emitter of this pair to the positive power supply terminal. Similarly, the common collector-base connection of the pair 23 is connected through a resistor 44 to the power supply terminal 41, and the output emitter of the transistor 28 is connected through a resistor 46 to this same terminal. Output voltage from the strain bridge, as amplified by the amplifier circuitry, is obtained between the output emitters of the pair 22 and 23, and this is indicated as the voltage $e_0$ between output terminals 47 and 48. Further connections include a resistor 51 connected to a terminal 52 between the emitter of the first transistor 24 and collector of the second transistor 26 of the first composite pair 22. Likewise, a resistor 53 is connected to a terminal 54 at the juncture of the emitter of the transistor 27 and collector of the transistor 28. These two resistors 51 and 53 are connected together and through a further resistor 56 to a negative excitation diagonally opposite from the positive excitation terminal 41. For simplicity, this negative excitation terminal 57 or return lead is indicated as electrical ground. As a further portion of the amplifier circuit employed with the strain bridge hereof, there is connected a resistive network R5 between the terminals 52 and 54 of the composite pairs 22 and 23, respectively.

As above noted, there is provided one composite pair amplifier in connection to each of the output diagonal terminals 31 and 32 of a strain bridge. The inputs of these amplifiers 22 and 23 are directly connected to the strain bridge terminals so that the bridge serves not only as a signal source, but also as a stable bias supply. Gain stability is obtained inasmuch as the voltage gain of each of the composite pair amplifiers is actually a function of the resistors in circuit therewith. Thus for composite pair 22, the voltage gain is a function of the value of resistors 42, 43, and 51. Consequently, temperature effects in the transistors employed in the amplification have a negligible effect on gain stability.

A certain unavoidable unbalance exists between the bridge elements and amplifier transistors, however this is herein cancelled out by adjusting the ratio of resistors 43 and 46 of the two composite pair amplifiers. It will be seen that with slightly different values of these resistors, there will result a slightly different gain in the two composite pair amplifiers. This is, in turn, corrected by adjusting the ratio of resistances 51 and 53. In this arrangement then one side of the overall amplification unit is balanced against the other, so that zero shifts with temperature and/or changes in bias level are minimized, if not eliminated.

The operating point of the transistors of the amplifiers is determined by the value of the resistance 56, inasmuch as this resistor operates in conjunction with the bridge voltages to establish transistor bias. It is thus possible to optimize the operating point of the transistors for best linearity independently from gain. Although the resistor 56 is illustrated in FIGURE 1 by the normal character for a common resistor, it is contemplated that the resistor shall, in actuality, include a positive temperature coefficient material, at least in part. In this manner changes in bias of the amplifiers resulting from temperature effects in the strain bridge are offset. Consequently, the operating point, and hence the linearity of the overall amplifier, is maintained fixed over a substantial temperature range.

Of major importance in connection with the achievement of high accuracy, sensitivity, and dependability is control over the differential voltage gain. This is provided herein by the network R5, which includes negative temperature coefficient elements thereby varying the amplifier gain as a function of temperature. The resistance value of this network R5 is selected to provide the desired output voltage $e_0$ for any given gauge sensitivity within a preselected range. Temperature variations affecting the sensor elements S1 to S4 likewise affect the network R5, so that there is provided a temperature compensation for sensitivity changes in the bridge that would otherwise result with temperature variations.

The circuit of a particular preferred embodiment of this invention as described above in connection with FIGURE 1, does not indicate the physical placement of invention elements. The schematic illustration of FIGURE 2 is intended to supplement the disclosure in this respect. Thus, as shown in FIGURE 2, the transducer unit 101 includes a strain bridge 102 having one or more semiconducting sensor elements therein. Also included in this transducer unit 101 is the amplifier circuit described above and illustrated in connection with the strain bridge. This amplifier unit is illustrated by the block 103 in FIGURE 2, and it will be appreciated that such block includes the two complementary composite connections described above, together with the associated circuitry likewise described. In actual use this transducer unit is positioned at a location wherein measurements of stress are to be accomplished. As an example, the transducer unit may, in conjunction with known mechanical elements, be employed as a pressure transducer. Only a minimum physical space is available for many transducer unit applications, and it will be seen that the strain bridge and amplifier hereof may be encompassed in a very minute housing, for example. As regards the energization of the strain bridge and measurement or indication of the output thereof, it is commonly preferable to locate power supply and measuring means remotely from the transducer unit. There is thus indicated in FIGURE 2 measuring leads 104 extending from the transducer output terminals 47 and 48 to a remotely located indicator 106. Likewise, there is illustrated in FIGURE 2 excitation leads 107 extending to a remotely located power supply, illustrated as a battery 108. In this latter respect, it is to be appreciated that one of the excitation leads 107 may, for example, comprise a ground return. Additionally, there is shown a further power supply 109 connected by leads 111 to the transducer unit, however this unit may comprise an amplifier connected to the power supply 108. One of these leads extends to the positive power supply terminal 41 of the amplifier of FIGURE 1, while the other lead 111 may, if desired, also be comprised of a ground return line. The broken portions of the leads extending from the transducer unit 101 are indicative of a substantial physical displacement which is possible between the excitation and indicating equipment associated with the transducer unit.

It will thus be seen from the foregoing that the amplifier elements, including the transistors and associated resistors thereof, are physically located in close proximity to the sensor elements of the strain bridge. Thus temperature variations affecting the properties and sensitivity of these sensor elements also affect the amplifier. In line with the above description of the amplifier circuit in operation, it will be seen that provision is made for taking full advantage of this situation. Not only does the amplifier 103 provide for cancellation of variations between bridge and transistor balance to minimize zero signal shifts with temperature and/or changes in bias level to the amplifier, but also there is obtained an optimization of the operating point of the transistors of the amplifier. The foregoing relates to the problems involved in the physical disposition of a transistor circuit in a position to experience substantial temperature variations. Insofar as the combination of amplifier and strain bridge is concerned, the utilization of a negative temperature coefficient network R5 between the two composite pairs of the amplifier will be seen to provide for compensation of strain gauge sensitivity with temperature. Consequently, it is also possible to calibrate the guage by conventional means such as remotely located resistors adapted for insertion in shunt with one or more sensor elements.

The network R5 is adjusted to independently trim the differential voltage gain of the circuit. The total value of resistance in the network R5 is selected to provide the desired output for any given gauge sensitivity within a predetermined selected range. Inasmuch as the network R5 contains resistive elements having a negative temperature coefficient, it will be appreciated that the gain of the amplifiers or the differential gain thereof is changed as a function of temperature. By the provision of the negative temperature coefficient in this network, it will thus be seen that compensation is provided for the sensitivity changes which occur in the bridge with temperature variations thereat. More specifically, a temperature change at the transducer which makes the sensors more sensitive to applied stress will then normally produce a greater output signal for the application of the same stress. The resistive network R5 experiences this same temperature variation, and consequently, changes the differential output of the amplifiers so that a smaller output appears for the same input signal, i.e., a like output is produced despite the sensitivity change of the bridge. As a result of this compensation, there will thus be seen to be provided for the substantially complete compensation of the bridge and associated circuitry for temperature variations occurring thereat. Effects upon the transistors of the amplifiers resulting from temperature variations are compensated for by the alternative means noted above.

With regard to zero stability, it will be appreciated that the circuitry hereof requires the utilization of stable resistors. Under this circumstance, the zero stability will then be seen to be a function of the semiconductor devices themselves and optimization of results may be obtained by the employment of silicon transistors having very low leakage currents. Furthermore, the base-emitter voltages in the input sections of the amplifiers may be matched to minimize both zero offset and zero shift with temperature.

While the present invention has been above described with respect to a particular preferred embodiment thereof, it will be appreciated that certain variations are possible therein within the scope of the present invention. Thus, it is set forth above that there shall be employed particular amplifier circuitry. However, it is possible to employ alternative amplification means or methods while yet practicing the present invention and obtaining at least certain of the advantages thereof. Certain simplifications of the circuitry hereof are also possible and in particular it is noted that although the illustration of FIGURE 2 shows a separate power supply 109, it is normally preferable to employ an amplifier connected to the excitation means to supply operating potentials to the amplifiers of the circuit hereof. Normally, then, the amplification and compensation means of the present invention is fully operated from the semiconductor bridge circuit, both as to bias voltages and input signals. As regards the above-described adjustment of resistances in the circuitry associated with the strain bridge, it will be appreciated that these resistances are normally preselected or preadjusted so as not to require any physical control following the packaging of the transducer, for example. Consequently, the resistors illustrated in FIGURE 1 are not shown as being variable, even though their resistance values are initially varied or controlled to attain the particular conditions identified.

The present invention provides an extremely accurate and advantageous transducer producing an amplified differential voltage output which is proportional to stresses applied to the strain bridge elements within very precise limits. In the application of semiconductor strain gauges, the values of forces measured and signals encountered are oftentimes extremely small so that quite unusual accuracy requirements are imposed. The present invention precludes a large number of normal sources of errors from arising in connection with the utilization of semiconductor strain gauges and does thus afford results which are unattainable from prior-art devices of this general type. It is furthermore noted that the transducer unit hereof contains not only the semiconductor strain bridge but also the transistorized amplifier associated therewith. Very advantageous results obtain from this combination, as set forth in some detail above. Conventional circuit elements are applicable for utilization in the circuitry of the present invention, and thus no detailed description of the individual elements is included herein. It is particularly noted in this respect that thermal resistors, such as the negative temperature coefficient elements employed in the network R5, are well known in the art, as are the transistors hereinabove described, and the sensor elements of the bridge.

What is claimed is:

1. An improved strain gauge comprising a strain bridge including at least one strain-sensitive semiconducting element and having output terminals at opposite ends of one bridge diagonal, means connected across the other bridge diagonal for the application of excitation voltage to the bridge, a first transistor amplifier including at least one transistor having an input connected directly to a first output terminal of said bridge, a second transistor amplifier including at least one transistor having an input connected directly to a second output terminal of said bridge, whereby both signal and bias voltages to the amplifiers are obtained from the bridge, and additional resistance having a negative temperature coefficient selected to adjust the output of both said amplifiers to compensate within said amplifiers for variations in signal at said inputs of said transistors caused by changes in the temperature environment of said strain-sensitive elements, said additional resistance being coupled between the emitters of said one transistor of said first amplifier and said one transistor of said second amplifier, and said additional resistance being located in physical proximity to semiconductor elements of said bridge thereby exposing both said bridge elements and said additional resistance to the same temperature environment, whereby differential output voltage appearing between outputs of said amplifiers as a measure of stress applied to semiconductor bridge elements is compensated for temperature variations of the bridge.

2. An improved circuit for utilization with a strain bridge having semiconducting sensor elements, comprising first and second like amplifiers, each of said amplifiers including first and second transistors with the base of the first transistor directly connected to an output terminal of the bridge and direct connection between the collector of the first transistor and the base of the second transistor and between the emitter of the first transistor and the collector of the second transistor, whereby each of said amplifiers has a very large current gain, a resistance network connected between the collectors of the second transistors of each of said amplifiers, said network including resistance having a negative temperature coefficient proportional to the temperature coefficient of sensor elements of the bridge and being disposed in close proximity with such sensor elements thereby exposing both said bridge elements and said resistance to the same temperature environment, for varying the amplifier gain to compensate for variations in sensor sensitivity with temperature variations, and a pair of indicating terminals connected one to the emitter of each of the second transistors of said two amplifiers whereby a differential output voltage appears between such terminals as an indication of stresses applied to said bridge.

3. An improved strain gauge comprising a plurality of semiconducting sensor elements electrically connected in a bridge circuit with excitation terminals at opposite points of one bridge diagonal and output terminals at opposite points of the alternate bridge diagonal, a first amplifier having a first transistor with the base thereof connected directly to one output terminal of said bridge and a second transistor of opposite polarity from said first transistor and having the base thereof connected to the collector of said first transistor, said first amplifier further including direct connection between the emitter of said first transistor and the collector of said second transistor, first and second resistors connected together to a power supply terminal of said amplifier with the first resistor connected to the collector of the first transistor, and the second resistor connected to the emitter of the second transistor of said first amplifier, a second amplifier including a first transistor having the base thereof connected directly to the other bridge output terminal and a second transistor of opposite polarity having the base thereof connected directly to the collector of the first transistor, said second amplifier further including direct connection between the emitter of said first transistor and the collector of said second transistor, third and fourth resistors connected to the same power supply terminal as said first and second transistors, the third resistor being connected to the collector of the first transistor of said second amplifier and the fourth resistor being connected to the emitter of the second transistor of said second amplifier, resistance means including a common resistor of positive temperature coefficient material connected between the other excitation terminal of the bridge and the common emitter-collector connections of each of said amplifiers whereby bias and signal voltage for said amplifier transistors is supplied by the bridge circuit and the common resistor regulates said bias to a constant value over a substantial temperature range, a resistance network connected between the common collector-emitter connections of the transistors of each of said amplifiers and including a resistance of negative temperature coefficient of predetermined relation to the temperature coefficient of the sensor elements of said bridge thereby exposing both said bridge elements and said resistance to the same temperature environment, for controlling the differential gain of said amplifiers in accordance with temperature variations of the bridge elements, and indicating terminals connected between the emitters of the second transistors of the first and second amplifiers whereat there is produced a differential voltage proportional to stresses applied to the bridge substantially independently of temperature variations of the bridge elements.

References Cited by the Examiner

UNITED STATES PATENTS

| | | | |
|---|---|---|---|
| 2,633,019 | 3/53 | Albrecht et al. | 73—88.5 |
| 2,775,118 | 12/56 | Legge et al. | 73—88.5 |
| 2,964,713 | 12/60 | Shepard et al. | 330—143 X |
| 3,018,445 | 1/62 | Stone | 330—13 |
| 3,034,345 | 5/62 | Mason | 73—141 |

OTHER REFERENCES

Slaughter: "The Emitter-Coupled Differential Amplifier," IRE Transactions on Circuit Theory, March 1956, pp. 51–53.

Middlebrook et al.: "Transistor A.C. and D.C. Amplifiers With High Input Impedance," Semiconductor Products, March 1959, pp. 26 to 35 (page 31 relied on).

Beneteau, P. J.: "The Design of High Stability D.C. Amplifiers," Semiconductor Products, February 1961, pp. 27 to 30.

RICHARD C. QUEISSER, *Primary Examiner.*

ROBERT L. EVANS, *Examiner.*